US011494451B2

(12) United States Patent
Gyongyi et al.

(10) Patent No.: US 11,494,451 B2
(45) Date of Patent: *Nov. 8, 2022

(54) PERSONAL SEARCH RESULT IDENTIFYING A PHYSICAL LOCATION PREVIOUSLY INTERACTED WITH BY A USER

(71) Applicant: Google LLC, Mountain View, CA (US)

(72) Inventors: Zoltan Gyongyi, Menlo Park, CA (US); Albert Segars, San Francisco, CA (US); Qun Cao, Sunnyvale, CA (US); Juthika Dabholkar, San Francisco, CA (US); Darryl DeWeese, Mountain View, CA (US); Anandsudhakar Kesari, Santa Clara, CA (US); Yiyuan Xia, Santa Clara, CA (US); Vincent Zammit, Belmont, CA (US)

(73) Assignee: GOOGLE LLC, Mountain View, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/850,320

(22) Filed: Apr. 16, 2020

(65) Prior Publication Data

US 2020/0285680 A1 Sep. 10, 2020

Related U.S. Application Data

(63) Continuation of application No. 16/103,685, filed on Aug. 14, 2018, now Pat. No. 10,664,541, which is a
(Continued)

(51) Int. Cl.
*G06F 16/9535* (2019.01)
*G06F 16/9537* (2019.01)

(52) U.S. Cl.
CPC ...... *G06F 16/9535* (2019.01); *G06F 16/9537* (2019.01)

(58) Field of Classification Search
None
See application file for complete search history.

(56) References Cited

U.S. PATENT DOCUMENTS

| 7,376,640 B1 * | 5/2008 | Anderson | G06F 16/9537 |
| | | | 707/E17.11 |
| 8,515,459 B2 | 8/2013 | Busch | |
| (Continued) | | | |

FOREIGN PATENT DOCUMENTS

| AU | 2012202738 | 5/2012 |
| CN | 101887448 | 11/2010 |
| (Continued) | | |

OTHER PUBLICATIONS

China National Intellectual Property Administration; Notice of Grant issued in Application No. 201480036718.4 dated Aug. 20, 2019.
(Continued)

*Primary Examiner* — Syling Yen
*Assistant Examiner* — Navneet Gmahl
(74) *Attorney, Agent, or Firm* — Middleton Reutlinger

(57) ABSTRACT

Methods and apparatus for generating, in response to a search query of a user, a personal search result that identifies a physical location previously interacted with by the user, such as a physical location previously visited by the user. Some implementations are directed to methods and apparatus for determining whether a search query is a personal locational query indicating a desire for information related to one or more physical locations previously interacted with by the user. Some implementations are directed to methods and apparatus for determining search parameters for such a personal locational query. Some implementations are directed to methods and apparatus for searching private content of the user to determine physical locations previously interacted with by the user that are responsive to such
(Continued)

a personal locational query. Some implementations are directed to methods and apparatus for generating personal search results that identify determined physical locations previously interacted with by the user.

20 Claims, 8 Drawing Sheets

Related U.S. Application Data continuation of application No. 13/939,884, filed on Jul. 11, 2013, now Pat. No. 10,089,394.

(60) Provisional application No. 61/839,346, filed on Jun. 25, 2013.

(56) References Cited

U.S. PATENT DOCUMENTS

| | | | |
|---|---|---|---|
| 9,300,741 B2* | 3/2016 | Garcia | G06Q 50/01 |
| 10,237,696 B2* | 3/2019 | Softer | H04W 4/025 |
| 2002/0069312 A1* | 6/2002 | Jones | G06Q 30/02 711/100 |
| 2004/0078372 A1* | 4/2004 | Huuskonen | G06Q 10/109 |
| 2005/0071328 A1* | 3/2005 | Lawrence | G06F 16/95 |
| 2005/0120003 A1 | 6/2005 | Drury et al. | |
| 2005/0246623 A1* | 11/2005 | Ma | G06F 16/951 715/201 |
| 2006/0047643 A1 | 3/2006 | Chaman | |
| 2006/0074883 A1* | 4/2006 | Teevan | G06F 16/9535 |
| 2006/0123014 A1* | 6/2006 | Ng | G06F 16/951 |
| 2007/0061332 A1* | 3/2007 | Ramer | G06F 16/9535 |
| 2007/0097929 A1* | 5/2007 | Dunko | G06F 16/9537 370/338 |
| 2008/0005079 A1* | 1/2008 | Flake | G06F 16/9535 |
| 2008/0097966 A1* | 4/2008 | Choi | G06F 16/9537 |
| 2008/0168033 A1* | 7/2008 | Ott | G06F 16/29 |
| 2008/0172357 A1 | 7/2008 | Rechis et al. | |
| 2008/0243611 A1 | 10/2008 | Delli Santi et al. | |
| 2009/0119261 A1* | 5/2009 | Ismalon | G06F 16/3322 |
| 2010/0082434 A1 | 4/2010 | Chen et al. | |
| 2010/0268704 A1 | 10/2010 | Chou | |
| 2011/0106614 A1* | 5/2011 | Ramer | G06Q 30/0247 705/14.46 |
| 2011/0137881 A1 | 6/2011 | Cheng et al. | |
| 2011/0208822 A1 | 8/2011 | Rathod | |
| 2011/0276396 A1 | 11/2011 | Rathod | |
| 2012/0124176 A1 | 5/2012 | Curtis et al. | |
| 2012/0245944 A1 | 9/2012 | Gruber et al. | |
| 2013/0117327 A1* | 5/2013 | Chmiel | G06Q 30/0201 707/802 |
| 2014/0010405 A1* | 1/2014 | Sivaraman | G01C 21/3476 382/103 |
| 2014/0059695 A1* | 2/2014 | Parecki | H04L 63/102 726/26 |
| 2014/0089283 A1* | 3/2014 | Klassen | G06F 16/9537 707/706 |
| 2014/0095303 A1 | 4/2014 | Jones et al. | |
| 2014/0214818 A1* | 7/2014 | Du | G06Q 10/101 707/723 |
| 2014/0214895 A1* | 7/2014 | Higgins | G06F 16/9535 707/770 |
| 2014/0236916 A1 | 8/2014 | Barrington et al. | |
| 2014/0379696 A1 | 12/2014 | Gyongyi et al. | |
| 2015/0169597 A1* | 6/2015 | Edge | G06F 16/9537 707/751 |
| 2017/0097939 A1* | 4/2017 | Zhu | G06F 16/90324 |

FOREIGN PATENT DOCUMENTS

| | | |
|---|---|---|
| EP | 2165437 | 3/2010 |
| WO | 2013033903 | 3/2013 |

OTHER PUBLICATIONS

China National Intelletual Proprty Administration; Office Action issued in Application No. 201480036718.4 dated Apr. 11, 2019.
European Patent Office; Summons issued in Application No. 14747431.6 dated Mar. 4, 2019.
Pravin Shankar et al.; Crowds Replace Experts: Building Better Location-Based Services Using Mobile Social Network Interactions; Pervasive Computing and Communications; ICCC Interantional Conference; pp. 20-29; Lugano Mar. 19, 2012.
European Patent Office; Communication issued in Application No. 14747431.6 dated Jun. 27, 2018.
State Intellectual Property Office; Office Action issued in Chinese Appl. No. 201480036718.4 dated Jul. 23, 2018.
European Patent Office; International Search Report and Written Opinion of PCT Serial No. PCT/US 14/43771; 8 pages; dated Nov. 20, 2014.

* cited by examiner

*Restaurants I went to in Philadelphia*  |  Search

Places you've visited

| Restaurant 1<br>Greek | | ← 910 |
| Restaurant 2<br>Italian | | ← 920 |
| Restaurant 3<br>Indian | | ← 930 |
| Restaurant 4<br>Pizza | | ← 940 |
| See 5 more places | | ← 950 |

Philadelphia's Best Restaurants
*www.exampleURL.com*
*Newspaper reviews of the best restaurants in town*

10 Best Philly Cheesesteaks
*www.exampleURL2.com*
*Our picks for the best cheesesteaks*

Philadelphia Restaurants
*www.exampleURL3.com*
*Ratings for the best restaurants by users*

FIG. 9

PERSONAL SEARCH RESULT IDENTIFYING A PHYSICAL LOCATION PREVIOUSLY INTERACTED WITH BY A USER

BACKGROUND

This specification is directed generally to providing search results and, more particularly, to generating at least one personal search result in response to a search query of a user, wherein the personal search result identifies a physical location previously interacted with by the user that is responsive to the search query.

Internet search engines often provide information about public documents such as web pages, images, text documents, and/or multimedia content. Generally, public documents may include information without access restrictions (e.g., a limiting condition on who can view and/or access the information). A search engine may identify the documents in response to a user's search query that includes one or more search terms and/or phrases. The search engine ranks the documents based on the relevance of the documents to the search query and the importance of the documents and provides search results that link to the identified documents. The search results may be presented to the user in an order that is based on the rank of the search results.

SUMMARY

The present disclosure is directed to methods and apparatus related to generating, in response to a search query of a user, a personal search result that identifies a physical location previously interacted with by the user, such as a physical location previously visited by the user. For example, some implementations are directed to methods and apparatus for determining whether a search query is a personal locational query indicating a desire for information related to one or more physical locations previously interacted with by the user. Also, for example, some implementations are directed to methods and apparatus for determining search parameters for such a personal locational query. Also, for example, some implementations are directed to methods and apparatus for searching private content of the user to determine physical locations previously interacted with by the user that are responsive to such a personal locational query. Also, for example, some implementations are directed to methods and apparatus for generating personal search results that identify determined physical locations previously interacted with by the user. Such personal search results may be provided to the user in response to a personal locational query of the user.

In some implementations a computer implemented method may be provided that includes the steps of: receiving a search query of a user; determining that the search query is a personal locational query indicating a desire for information related to one or more physical locations previously interacted with by the user; determining, based on the search query, at least one search parameter for identifying the one or more physical locations previously interacted with by the user; receiving user information of the user; accessing, based on the user information, private content that is accessible to the user and non-accessible to a plurality of additional users that lack authorization to access the private content; determining responsive content of the private content, the responsive content being responsive to the at least one search parameter; determining, based on the responsive content, a physical location previously interacted with by the user; and generating a personal search result based on the responsive content, the personal search result identifying the physical location previously interacted with by the user.

This method and other implementations of technology disclosed herein may each optionally include one or more of the following features.

Generating the personal search result based on the responsive content may include determining additional content related to the responsive content from at least one resource that is additional to the private content; and including the additional content in the personal search result. The additional content may be determined based on a mapping between the responsive content and the additional content. The responsive content may be a first property of an entity and the additional content may be at least a second property of the entity. The additional content may include one or more of a picture of the entity, a search query that will retrieve search results particularly focused on the entity, and contact information for the entity.

Generating the at least one personal search result based on the responsive content may include determining, based on the responsive content, one or more relationships between the user and the physical location; and providing, in the search result, an indication of the one or more relationships between the user and the physical location. The one or more relationships may each indicate at least one action type of the responsive content utilized to determine the physical location was previously interacted with by the user. The action type may include at least one of a check-in, a review, and a location data based interaction indication.

The step of determining the query is a personal locational search query may be based on matching at least one personal locational query term to one or more terms of the search query.

The step of determining that the query is a personal locational search query may be based on determining presence of one or more personal locational semantic segments in the search query, each of the personal locational semantic segments based on one or more terms of the search query. The personal locational semantic segments may include at least one of a location entity category segment, an action type segment, a reference geographic area segment, a temporal segment, and a business location identifier segment.

The step of determining the query is a personal locational search query may be based on matching a syntactical arrangement of one or more terms of the search query to one or more personal locational query syntactical arrangements.

The method may further include providing the personal search result for display to the user.

The method may further include obtaining public search results based on the query; and providing the public search results for display with the personal search result. The method may further include formatting the personal search result and the public search results to visually separate the personal search result from the public search results. Formatting the personal search result and the public search results to visually separate the personal search result from the public search results may include providing a search results webpage wherein the personal search result is presented in a more prominent positional location than the public search results.

The method may further include determining that the search query indicates a desire for information related only to previous visits of the user to the one or more physical locations; and the at least one search parameter for identifying the one or more physical locations previously interacted with by the user may be a search parameter for returning information related only to previous visits of the user to the one or more physical locations.

In some implementations a computer implemented method may be provided that includes the steps of: receiving a search query of a user, the search query including a plurality of terms; determining that one or more of the terms of the search query define a first locational semantic segment, the first locational semantic segment being an action type indicating one or more actions associated with one or more previous interactions of the user with one or more physical locations; determining that one or more of the terms of the search query define a second locational semantic segment, the second locational semantic segment being one of a reference geographic area and a location entity category; wherein the reference geographic area indicates a geographic area associated with the previous interactions of the user; and wherein the location entity category indicates one or more categories of the physical locations of the previous interactions; determining one or more first search parameters based on the first locational semantic segment; determining one or more second search parameters based on the second locational semantic segment; accessing private content of the user; determining responsive content of the private content, the responsive content indexed with the first search parameters and the second search parameters; determining, based on the responsive content, a physical location previously interacted with by the user; and generating a personal search result based on the responsive content, the personal search result identifying the physical location previously interacted with by the user.

This method and other implementations of technology disclosed herein may each optionally include one or more of the following features The method may further include determining the search query is a personal locational query; wherein determining the search query is a personal locational query is based at least in part on determining that the terms of the query define the first locational semantic segment and the second locational semantic segment; and wherein the generating the personal search result occurs only when the search query is determined to be a personal locational query.

The action type of the first locational semantic segment may be a class of action types and determining the at least one first search parameter may include determining a plurality of members of the class of action types and including one or more of the members in the first search parameters. The class of action types may be visits and the members may include one or more of a check-in, a review, a location data based interaction indication, a user's social network content, a user interaction with an application, a user's directional query, an e-mail of the user, a search, and a mapped based indication of interest. Generating the personal search result based on the responsive content may include determining, based on the responsive content, a single member of the members of the class of action types; and providing, in the search result, an indication of the single member.

The second locational segment may be the reference geographic area. Determining the at least one second search parameter may include determining additional geographic areas contained by the reference geographic area and including the additional geographic areas in the at least one second search parameter. Determining the at least one second search parameter may include determining at least one additional geographic area near the reference geographic area and including the additional geographic area in the at least one second search parameter.

Generating at least one personal search result based on the responsive content may include determining additional content related to the responsive physical location from at least one resource that is additional to the private content; and including the additional content in the personal search result. The additional information may be determined based on a mapping between the responsive content and the additional content.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

Particular implementations of the subject matter described herein analyze one or more aspects of a search query to determine if the search query is a personal locational query and/or to determine one or more search parameters. These determinations represent new aspects of a submitted search query that may be derived from the submitted search query and optionally one or more additional sources. Particular implementations of the subject matter described herein access private content of the user to determine a physical location previously interacted with by the user based on the private content responsive to such a personal locational query and generate a personal search result that identifies the determined physical location. These personal search results represent new aspects of a submitted search query that may be derived from the submitted search query, the private content responsive to the search query, and optionally one or more additional sources. The personal search results may be utilized by one or more applications, such as a search system, to provide improved search results to users of the applications. Particular implementations of the subject matter described herein enable a user to search both private content and public content (e.g., the World Wide Web) through a single user interface. Such combined searching of both private and public content may increase efficiency for the user and/or for the search system in searching for both private content and public content.

It should be appreciated that all combinations of the foregoing concepts and additional concepts discussed in greater detail herein are contemplated as being part of the inventive subject matter disclosed herein. For example, all combinations of claimed subject matter appearing at the end of this disclosure are contemplated as being part of the inventive subject matter disclosed herein.

BRIEF DESCRIPTION OF THE DRAWINGS

FIG. 9 illustrates an example graphical user interface for displaying personal search results and public search results in response to an example personal locational query.

DETAILED DESCRIPTION

The present disclosure is directed to methods and apparatus related to generating, in response to a search query of a user, a personal search result that identifies a physical location previously interacted with by the user. In some implementations, a previous interaction of a user with a physical location is a user visit to the physical location as indicated by one or more items of content, such as one or more items of private content described herein. In some implementations a previous interaction of a user with a physical location is one or more user actions that indicate interest in the physical location, but do not necessarily indicate a visit to the physical location as indicated by one or more items of content, such as one or more items of private content described herein. As an example, a user interface may be provided to the user to enable the user to submit a search query to search private content and, optionally, public content. When a search query is received via the user interface, it may optionally be determined whether the search query is a personal locational query indicating a desire for information related to one or more physical locations previously interacted with by the user. For example, the search query "restaurants I've visited in Atlanta" may indicate a desire for information related to restaurants that a user submitting the search query has previously visited in Atlanta. On the other hand, the search query "movie stars" may not indicate a desire for information related to one or more physical locations visited by the user.

One or more search parameters may be determined for a received personal locational query and private content of the user may be searched to determine physical locations previously interacted with by the user that are responsive to the personal locational query. For example, for the search query "restaurants I've visited in Atlanta", search parameters may include and/or be based on one or more terms of the search query and may be utilized to search private content of the user to determine restaurants in Atlanta that were previously visited by the user. A personal search result may be generated that identifies the determined restaurants in Atlanta previously visited by the user and such personal search results may be provided to the user. In some implementations public content may also be searched to identify public content that is responsive to the search query. Search results related to identified public content may also be generated and provided in combination with the personal search results.

Figure 1:
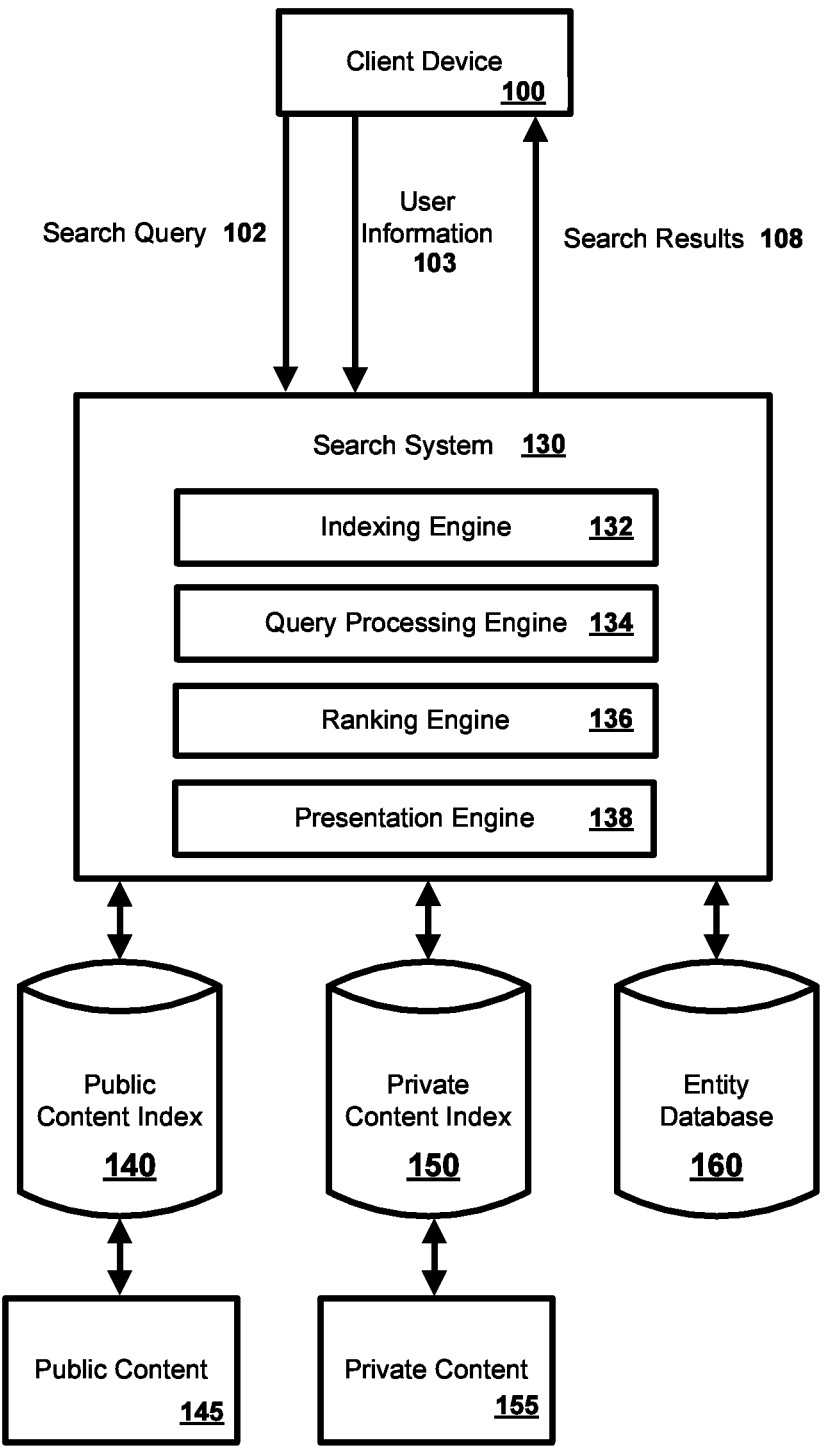
FIG. 1 is a diagram of an example environment in which a personal search result may be generated in response to a search query of a user.

FIG. 1 is a diagram of an example environment in which a personal search result may be generated in response to a search query of a user. The example environment includes a client device 100, a search system 130, a public content index 140 including an index of public content 145, a private content index 150 including an index of private content 155, and an entity database 160. One or more communication networks may be utilized to facilitate communication between the various components of the environment. In some implementations, the communication networks may include the Internet, one or more intranets, and/or one or more bus subsystems. The communication networks may optionally utilize one or more standard communications technologies, protocols, and/or inter-process communication techniques.

The example search system 130 provides search results 108 to the client device 100 that are relevant to a search query 102 submitted via the client device 100. In some other implementations a first client device (e.g., a first computing device of a user) may submit the search query 102 and search results 108 may be provided to a second client device (e.g., a second computing device of the user). As discussed herein, the search results 108 may include at least one personal search result that identifies a particular physical location previously interacted with by the user. In some implementations the search results 108 may include only personal search results. For example, the search query 102 may be submitted via an interface that is a personal search interface and that embeds information in search query 102 that indicates the search query is requesting only personal search results. Also, for example, the search query 102 may be determined to be a search query that indicates the search query is requesting only personal search results. Also, for example, public search results may fail to satisfy a ranking threshold and only personal search results may be provided. The ranking threshold of the public search results may be a set threshold and/or a threshold based on a ranking of the personal search results. In some implementations the search results 108 may include both personal search results and public search results.

The search system 130 can be implemented in one or more computers that communicate, for example, through a communication network. The search system 130 is an example of an information retrieval system in which one or more aspects of systems, components, and techniques described herein may be implemented. Each search query 102 is a request for information. The search query 102 can be, for example, in a text form and/or in other forms such as, for example, audio form (e.g., spoken input of a user), and/or image form (e.g., based on an image captured via the client device 100). Other computing devices may submit search queries to the search system 130 such as other client devices and/or a server implementing a service for a website that has partnered with the provider of the search system 130. For brevity, however, the examples are described in the context of the client device 100.

A user may interact with the search system 130 via the client device 100. The client device 100 may be a computer coupled to the search system 102 through a communications network such as a local area network (LAN) or wide area network (WAN) such as the Internet. Example client devices 100 include a desktop computer, a laptop computer, a cellular phone, a smartphone, a personal digital assistant (PDA), a wearable computing device (e.g., digital watch, earpiece, glasses), a tablet computer, a navigation system, and/or another computing device that can send and receive data over a network. The client device 100 typically includes one or more user applications to facilitate the sending and receiving of data over a network. The client device 100 and the search system 130 each include memory for storage of data and software applications, a processor for accessing data and executing applications, and components that facilitate communication over a network. The operations performed by the client device 100 and/or the search system 130 may be distributed across multiple computer systems.

The search system 130 includes an indexing engine 132, a query processing engine 134, a ranking engine 136, and a presentation engine 138. In some implementations one or more of engines 132, 134, 136, and/or 138 may be omitted. In some implementations all or aspects of one or more of engines 132, 134, 136, and/or 138 may be combined. In some implementations one or more of engines 132, 134, 136, and/or 138 may be implemented in a component that is separate from the search system 130.

The indexing engine 132 maintains the private content index 150 and the public content index 140 for use by the search system 130. In the example of FIG. 1, the indexing engine 132 processes public content 145 and updates index items in the public content index 140, using, for example, conventional and/or other indexing techniques. For example, the indexing engine generates public content index 140 by crawling the World Wide Web and indexing publicly accessible documents as is commonly known in the art. A document is any data that is associated with a document address. Documents include HTML pages, word processing documents, portable document format (PDF) documents, images, video, and feed sources, to name just a few. The documents may include content such as, for example: words, phrases, pictures, etc.; embedded information (such as meta information and/or hyperlinks); and/or embedded instructions (such as JavaScript scripts). In some implementations the public content index 140 may be omitted.

The indexing engine 132 also maintains private content index 150 that indexes private content 155. Private content index 150 enables searching of private content 155 to determine whether an item of private content 155 is relevant to the search query 102 without necessitating searching the entirety of private content 155. In some implementations private content index 150 may be omitted and private content 155 may be searched directly. In some implementations the private content index 150 is specific to a particular user and the private content 155 is private content that is accessible to the user and non-accessible to a plurality of additional users that differ from the user. For example, the private content 155 may be accessible only to the user and non-accessible by any other users. Also, for example, the private content 155 may be accessible to the user and certain additional users designated by the user. As described herein, the private content index 150 and the private content 155 may be associated with access information to allow access only to users who are authorized to access such content and prevent access to all other users.

In some implementations, the private content index 150 includes an index of private items of a plurality of users, with each index item and/or a group of index items associated with access information to allow access only to users who are authorized to access such index items and prevent access to all other users. Thus, the private content index 150 may include index items for a plurality of users, but each index item and/or a group of index items may include access information to prevent access by any users not authorized to access such index items. Similarly, private content 155 may include a collection of private items of a plurality of users, with each item and/or a group of items associated with information to allow access only to users who are authorized to access such items and prevent access to all other users. Thus, the private content 155 may include items of a plurality of users, but each item and/or a group of items may include access information to prevent access by any users not authorized to access such items.

Using private content 155, indexing engine 132 generates index items and stores the index items in private content index 150. Generally, an index item includes information that indexes one or more items of private content 155. For example, an index item for a given item of private content 155 may include portions of the given item that the indexing engine 132 has determined are relevant for identifying and/or for searching contents of the given item, information describing contents of the given item, keywords for the given item, and/or a unique identifier for the given item. An index item may also include information specifying a document location of the given item including, for example, a uniform resource location (URL) or other document location identifier. In some implementations determined information for a given item may be determined by parsing contents of the given item.

As discussed, in some implementations, index items in the private content index 150 and/or items of the private content 155 may each be associated with access information to allow access only to users who are authorized to access such content and prevent access to all other users. Any generated index item may include and/or be associated with an access control list with access information that generally specifies identities of one or more users that are authorized to access the generated index item. For example, indexing engine 132 may determine one or more users that are authorized to access an item of private content 155 and include an access control list with an index entry based on such item of private content 155 that lists those authorized users. In such an example, the item of private content 155 may include access information that specifies the identity of users that are authorized to access the item of private content 155. For example, the item of private content 155 may be a location data indicated interaction of a user with a particular physical location and the location data indicated interaction may include information that specifies that only that user is authorized to access that item of private content.

As described herein, in some implementations user information 103 is provided with the search query 102 (e.g., appended to the search query 102 and/or provided with, but separate from, separate from the search query 102). The user information 103 may be utilized to determine which index items in the private content index 150 the user submitting the search query 102 may access. For example, only those index items in the private content index 150 that are associated with access information that is determined to match the user information 103 may be accessed. Additional and/or alternative techniques for restricting access to index items in the private content index 150 and/or items of the private content 155 may be utilized.

In some implementations, hash functions are utilized to encrypt index items in the private content index 150 and/or items of private content 155 to promote secure storage. In some implementations an entry in the private content index 150 may be associated with a wrapped key to promote secure storage. Generally, a wrapped key includes an encrypted key. To unwrap (e.g., decrypt) the wrapped key, the search system 130 sends the wrapped key to another security system. The security system sends the unwrapped key to the search system 130 to enable the search system 130 to decrypt the entry. Additional and/or alternative techniques for promoting secure storage of index items in the private content index 150 and/or items of the private content 155 may be utilized.

Private content 155 of an individual user may include items from one or more sources of the user such as, for example, the user's e-mails (sent and/or received), the user's social network content, the user's calendar, the user's transaction history, the user's interactions with an application such as a mapping application, location data of the user, and so forth. Private content 155 may include items that are indicative of a user's interactions with one or more physical locations. As used herein, a physical location references an entity that is associated with one or more geographic locations. A physical location may be referenced with any level of granularity. For example, a physical location may be a shopping mall, a particular store in the shopping mall, and/or a particular department in a store in the shopping mall.

In situations in which the systems discussed herein collect personal information about users, or may make use of personal information, the users may be provided with an opportunity to control whether programs or features collect information personal to the user (e.g., information about a user's social network, email, social actions or activities, browsing history, a user's preferences, or a user's current geographic location), or to control whether and/or how to receive content from the content server that may be more relevant to the user. Also, certain data may be treated in one or more ways before it is stored or used, so that personally identifiable information may be removed. For example, a user's identity may be treated so that personally identifiable information may not be determined for the user, or a user's geographic location may be generalized where geographic location information may be obtained (such as to a city, ZIP code, or state level), so that a particular geographic location of a user may not be determined. Thus, the user may have control over how information is collected about the user and/or used.

One or more items of private content 155 may indicate that a user has interacted with a given physical location and may optionally include information specifically related to the user's interaction with the given physical location. For example, information related to the user's interaction with the given physical location may include one or more action types indicative of the one or more actions of the user that associated the previous interaction with the physical location with the user. Action types include, for example, a check-in to the given location by the user, a review of the given location by the user, a past reservation of the user to the given location, location data of the user indicating an interaction with the given location, and so forth. Also, for example, information related to the interaction with the given physical location may include a date and/or a time associated with the user's interaction with the given physical location. For example, information related to the visit to the given physical location may include a date and/or a time associated with the user's visit to the given physical location. Also, for example, information related to the user's interaction with the given physical location may include information related to the purpose of an actual or intended visit to the given physical location. For example, multiple activities may be capable of being engaged in at a given physical location and information related to the visit may identify one or more of the multiple activities that the user actually engaged in during an actual visit or plans to engage in during an intended visit. For example, multiple activities may be capable of being engaged in at a park such as walking, running, frisbee golf, etc. and information related to a visit may identify one or more of the multiple activities that the user actually engaged in during the visit. Also, for example, multiple types of shows may be presented at a venue such as concerts, plays, comedic performances, etc. and information related to a visit may identify one of the multiple types of shows performed during an actual visit of the user, or to be performed during an intended visit of the user.

One or more items of private content 155 may further optionally include information related to the given physical location that is not specific to the user's interaction with the given physical location. For example, information related to the given physical location may include information related to a geographic area associated with given physical location such as, for example, a city, a region, a neighborhood, a state, a zip code, a coordinate (e.g., latitude/longitude pair), and so forth. Also, for example, information related to the given physical location may include information related to a location entity category associated with the given physical location such as, for example, a restaurant, a hotel, a retail store, a hair salon, a nail salon, a hardware store, and so forth. A location entity category is an identifier of a collection of entities associated with a physical location that each have one or more properties in common. For example, all restaurants may belong to a location entity category of "restaurants", while only restaurants that serve Italian cuisine may belong to a location entity category of "Italian restaurants".

Index items in the private content index 150 may include index items based on one or more items of the private content 155 that indicate a user has visited or otherwise interacted with a given geographic location. For example, an index item in the private content index 150 may be based on an item of private content 155 that is a check-in of the user to a physical location. The check-in may include, for example, information identifying the physical location, a geographic area of the physical location, and information identifying a date and time of the check-in. Such information may be parsed from the check-in and included in an index item in the private content index 150. In some implementations the index item in the private content index 150 may include an explicit indication of a user interaction with the physical location. In some implementations the content of the index item in the private content index may provide an indication of a user interaction with the physical location. For example, the presence of certain terms and/or identifiers in an index item may be indicative of a user interaction with the physical location associated with the index item. Also, for example, the presence of certain terms and/or identifiers in an index item may be indicative of a user actually visiting the physical location associated with the index item. Also, for example, the presence of certain terms and/or identifiers in an index item may be indicative of a user interacting with, but not actually visiting, the physical location associated with the index item.

In some implementations additional information related to the physical location may optionally be determined from one or more resources that are in addition to the private content 155 and included in the index item in the private content index 150. For example, in some implementations a location entity category of the physical location may not be explicitly mentioned in the check-in, but may be determined with reference to a database such as entity database 160. In some implementations, all or aspects of the entity database 160 may be included in the public content index 140. For example, the entity associated with the physical location may be identified in an entity database 160 and one or more entity categories mapped to the entity associated with the physical location in the entity database 160 may be determined. An identifier of the determined location entity category may be included in the index item in the private content index 150.

Various items of content of private content 155 may be indicative of a user's interactions with one or more physical locations. For example, the user's e-mails (sent and/or received) may be indicative of the user's interactions with one or more physical locations. For example, a received e-mail of the user may be a reservation confirmation at a restaurant for a date and time that is in the past and based on such e-mail it may be determined that the user dined at the restaurant on the date at the noted time. An indication that the user dined at the restaurant on the date at the noted time may be included in an index item in private content index 150. Also, for example, a received e-mail of the user may be a reservation confirmation at a restaurant for a date and time that is in the future and based on such e-mail it may be determined that the user intends to dine at the restaurant on the date at the noted time. An indication that the user has indicated interest in the restaurant and intends to interact with the restaurant on the date at the noted time may be included in an index item in private content index 150. Also, for example, a received e-mail of the user may be a confirmation that the user is attending an event at a venue for a date and time that is in the past and based on such e-mail it may be determined that the user attended the event at the venue on the date at the noted time. An indication that the user attended the venue on the date at the noted time may be included in an index item in private content index 150. Also, for example, a received e-mail of the user may be a confirmation that the user is attending an event at a venue and based on such e-mail it may be determined that the user has interest in the venue. An indication that the user has interest in the venue may be included in an index item in private content index 150. Also, for example, one or more sent or received e-mails of the user may mention a physical location and based on such e-mails it may be determined that the user has interest in the physical location. An indication that the user has interest in the physical location may be included in an index item in private content index 150.

Also, for example, the user's social network content may be indicative of the user's interaction with one or more physical locations. For example, a user check-in to a park via the user's social network may be indicative of the user's visit to the park and may include information related to the user's visit to the park (e.g., that the user "checked-in", the date and/or time of the check-in, and one or more activities engaged in at the park (e.g., jogging, tennis, soccer)) and/or related generally to the park (e.g., the name of the park, location of the park). An indication that the user visited the park and/or aspects of information related to the user's visit to the park and/or related generally to the park may be included in an index item in private content index 150. The term "check-in", as used herein, includes a user-approved and/or user-initiated indication of a visit to a physical location. For example, a user at a Location A may be provided, via a mobile computing device, with an option to verify that the user is at Location A. For example, the option to verify may be in the form of a prompt provided to the user, such as, for example, "Would you like to check-in to your current location?" along with a list of selectable options including "Location A", "Location B", and "Location C". The user may select "Location A" in response to the prompt to check-in to Location A. Also, for example, a user may choose to automatically check-in to one or more locations visited by the user. For example, location data may indicate that the user is at Location A, and the user, via a mobile computing device, may automatically check-in to Location A. Additional and/or alternative techniques to check-in to a physical location may be utilized including those that occur outside of a social network context.

Also, for example, the user's calendar content may be indicative of the user's interactions with one or more physical locations. For example, a user's past calendar entry may include reservation information related to a stay at a particular hotel on one or more dates. An indication that the user stayed at the hotel on the noted dates may be included in an index item in private content index 150.

Also, for example, the user's interactions with one or more applications may be indicative of the user's interactions with one or more physical locations. For example, the user may review a physical location on a review website utilizing a web-browser and the user's review may provide an indication that the user visited the physical location. An indication that the user visited the physical location may be included in an index item in private content index 150. Also, for example, the user may assign a rating to a physical location via a mapping application (e.g., accessed via a web-browser and/or a stand-alone mapping application) and the user's rating may provide an indication that the user visited the physical location. An indication that the user visited the physical location may be included in an index item in private content index 150. Also, for example, the user may submit a web-based search query and/or a map-based search query that includes a physical location and/or is specifically tailored to a physical location and such a search may be an interaction of the user with the physical location. For example, if an alias of the physical location is included in the search query and the entity associated with the physical location is prominent in the search results for the search query, the search may be an interaction of the user with the physical location. An indication that the user interacted with the physical location may be included in an index item in private content index 150. Also, for example, the user may "star" a physical location or otherwise indicate interest in a particular location via a mapping application and the user's indication of interest may be an interaction of the user with the physical location. An indication that the user interacted with the physical location may be included in an index item in private content index 150.

Also, for example, location data of the user may indicate a user's interaction with one or more physical locations. For example, location data of a user that indicates presence of the user at a restaurant for an hour may provide an indication that the user ate at the restaurant. An indication that the user visited the restaurant location may be included in an index item in private content index 150 based on such location data based indication of a visit to the restaurant. Also, for example, location data of a user that indicates presence of the user at a movie theater for two hours may provide an indication that the user watched a movie at the movie theater. Location data may be associated with, for example, an entity associated with the location data, a date associated with the location data, and/or one or more times associated with the location data and such information may optionally be included in a location based indication of a visit and/or an index item based on such location based indication of a visit.

In some implementations a user may be presented with the option to verify a visit to a physical location determined via location data before the visit is associated with the user as private content. Location data may be captured utilizing, for example, GPS, Wi-Fi signals, cellular phone triangulation, RFID, and/or other techniques. In some implementations, location data may be detected via one or more hardware components of a computing device of the user such as client device 100. For example, location data may be detected via receiving signals generated by a hardware component of the computing device that are indicative of the position of the user and/or the position of the computing device 100. In some implementations, location data of a user may be identified on a periodic basis, such as every 30 seconds. In some implementations, location data may be identified asynchronously, such as when the user is detected as changing location by more than 100 feet. In some implementations, location data may be provided when the user is stationary for a time period and/or has arrived at a waypoint while moving. For example, location data may be provided when the user has stopped for more than five minutes before changing locations.

In some implementations the location data may be based on a directional query issued by the user. Directional queries include queries that seek directions to a physical location. Directional queries may be issued by the user to one or more mapping applications. For example, the user may submit a directional query via client device 100 that seeks directions to a physical location. One or more mapping applications may be utilized to return directions to the physical location. The location data based on a directional query may be utilized to determine a user interaction with the physical location. For example, it may be determined that if a user issued the directional query to the physical location the user actually traveled to the physical location. In some implementations additional data associated with the user may be utilized to determine whether the user visited the physical location such as check-ins, stars, reviews, or other data discussed herein and/or other data such as web navigation history associated with the user to see if the user sought additional information related to the physical location. In some implementations directional queries may include active directional queries that seek active directions to a location, such as via a device equipped with GPS. For example, a user may submit an active directional query by providing the address of a geographic location to a navigation device equipped with a GPS and may receive active turn-by-turn directions to the geographic location. Location data of such active directional queries may also be utilized.

In some implementations at least some of the private content 150 is retrieved via crawling of one or more sources. For example, a source may be an e-mail provider and a user may have provided permission to enable crawling of the user's e-mail account. In some implementations at least some of the private content 155 is provided by one or more sources without necessitating crawling of the sources. For example, one or more sources may provide the content at pre-defined intervals and/or when new content (e.g., not previously stored and/or indexed) is available. As discussed herein, in some implementations a user may have control over what content may be crawled and/or what content is provided by one or more sources. In some implementations, items of crawled and/or provided content may be formatted to promote efficient indexing of the items. For example, the items may be formatted to comply with a standard for the storage and/or the display of data such as a standard that specifies how different data elements and metadata coexist in a computer file, a standard that specifies a particular way that information is encoded for storage in a computer file, a standard that specifies how to convert a specific type of data to another type of data, and so forth.

Although a separate public content index 140 and private content index 150 are illustrated, in some implementations indexing engine 132 may generate a single index for indexing private content 155 and public content 145 rather than generating separate indexes 140 and 150.

The search system 130 receives search query 102 submitted by a user via client device 100. In some implementations the query processing engine 134 may determine if the search query 102 from client device 100 is a personal locational query indicating a desire for information related to one or more physical locations previously interacted with by the user. In some implementations whether the search query is determined to be a personal locational query is based on whether the search query contains one or more terms indicative of a personal locational query. For example, terms indicative of a personal locational query may include explicit terms such as, for example, "my", "I", "check-in", "visits", "visited", "last week", "last month". Also, for example, terms indicative of a personal locational query may include a category of terms such as, for example, past tense verbs ("visited", "stayed", "ate", "dined").

In some implementations whether the search query 102 is determined to be a personal locational query is based on the syntactical arrangement of one or more terms of the search query 102. For example, certain syntactical arrangements of terms may be identified as indicative of a personal locational query. For example, presence of "my" as the first word of a search query may be indicative of a personal locational query. Also, for example, presence of "my" as the first word of a search query followed by one or more defined entity categories (e.g., "places", "restaurant", "hotels"), defined nouns (e.g., "check-ins", "visits"), and/or one or more terms indicative of a time period (e.g., "last month", "last week", "January") may be indicative of a personal locational query. In some implementations weightings may optionally be assigned to certain syntactical arrangements. For example, presence of "my" as the first word of the search query (irrespective of the arrangement of other terms in the search query) may be associated with a first weighting less indicative of a personal locational query than presence of "my" as the first word of the search query followed by one or more defined entity categories.

In some implementations whether the search query 102 is determined to be a personal locational query is based on the presence and/or arrangement of one or more locational semantic segments in the search query 102. Each locational semantic segment includes one or more terms of the search query that may be mapped a category defined as a category indicative of a personal locational query. Locational semantic segments may include one or more of an action type segment, a location entity category segment, a geographic area segment, a temporal segment, and a business location alias segment.

An action type is indicative of one or more actions of the user that associated a previous interaction with a physical location with the user. Actions of the user that associated a previous interaction with a physical location with the user may include, for example, a check-in to the given location by the user, a review of the given location by the user, a past reservation of the user to the given location, a future reservation of the user to the given location, receipt of the user for the given location, location data of the user indicating a visit to the given location, and so forth. Terms that may be mapped to an action type segment include, for example, "check-in", "checkins", "visits", "visited", "reviews", "reviewed", "interactions", "location data", "reservations", and so forth.

A location entity category is an identifier of a collection of entities associated with a physical location that each have one or more properties in common. For example, all restaurants may belong to a location entity category of "restaurants", while only restaurants that serve pizza may belong to a location entity category of "pizzerias". Terms that may be mapped to a location entity category segment may include, for example, "hotel", "airport", "park", "barber shop", "book store", "mall", "department store", and so forth.

A geographic area is an area associated with one or more geographic locations. Terms that may be mapped to a geographic area segment include, for example, one or more aliases of a city (e.g., "New York City", "NYC"), a county (e.g., "Orange County") a region (e.g., "Southern US", "nearby"), a neighborhood (e.g., "Wrigleyville"), a state (e.g., "Kentucky"), a country (e.g., "France"), a zip code (e.g., "90210"), a coordinate (e.g., a latitude/longitude pair), and so forth.

A temporal segment includes one or more terms that are associated with at least one or more determinable dates and/or times. Terms that may be mapped to a temporal segment include, for example, "last week", "this year", "April", "Summer", "breakfast", "before noon", "dinner", and so forth. In search queries that do not explicitly specify a date and/or a time, an explicit date and/or a time may be determined and utilized as a temporal segment. For example, the phrase "last week" may be determined to be a date range that is from fourteen days to seven days before the current date. Also, for example, the phrase "this year" may be determined to include any dates up to and including the current date. Also, for example, "3 hours ago" may be determined to include a time that is approximately three hours from the current time.

A business location alias is an alias that is associated with a business entity such as the trade name used by the business entity. In some implementations a business entity may have multiple business location aliases. For example, a coffee shop may have a first alias of "A's Brewed Coffee" and a second alias of "AB Coffee". Terms that may be mapped to a business location alias include, for example, "Starbucks", "Hilton", etc. In some implementations business location aliases may be determined via a database such as entity database 160.

In some implementations, the more locational semantic segments that are included in a search query, the more likely the search query is to be determined to be a personal locational search query. For example a search query that includes only the locational semantic segments of action type and geographic area may be less likely to be determined to be a personal locational search query than a search query that includes those locational semantic segments and a local entity category locational semantic segment. In some implementations weightings may optionally be assigned to certain locational semantic segments. For example, presence of an action type segment in a search query may be more indicative of a personal locational query than the presence of a temporal segment.

In some implementations a database of possible terms may be consulted to determine if one or more terms of a query is a locational semantic segment. For example, one or more terms of a query may be identified as a particular locational semantic segment based on a mapping of that term to the particular locational semantic segment in a database such as entity database 160. In some implementations whether one or more terms are identified as a particular locational semantic segment may additionally and/or alternatively be based on the format of the one or more terms. For example, any term formatted as a date (e.g., year; month; month and day; month, day, and year) may be determined to be a temporal locational semantic segment. In some implementations whether one or more terms are identified as a locational semantic segment may additionally and/or alternatively be based on the presence and/or position of other terms in the search query. For example, whether one or more terms are identified as a locational semantic segment may be based on where the terms appear in the query, what terms occur before and/or after the terms in the query, how many other terms are present in the query, and/or what terms occur immediately next to the terms in the query. Additional and/or alternative techniques may be utilized to determine locational semantic segments and/or to determine whether a query is a personal locational query.

In some implementations the query processing engine 134 may additionally and/or alternatively determine one or more search parameters based on the search query 102. In some implementations the search parameters include one or more terms of the search query 102 and/or one or more synonyms of one or more terms of the search query. In some implementations the search parameters are based on determined locational semantic segments of the search query. In some implementations one or more items of the private content 155 indicative of user visits to physical locations may be associated with one or more locational semantic segments such as action type, a location entity category, a geographic area, and temporal to enable efficient searching of such items based on determined locational semantic segments of the search query. For example, an item of private content 155 may include information related to one or more locational semantic segments and/or may be indexed in private content index 150 based on one or more locational semantic segments.

In some implementations the search parameters are based on expanded interpretations of one or more determined locational semantic segments of the search query. For example, a determined locational semantic segment of the search query may be an action type that is a class of action types that includes a plurality of members. For example, "visits" may be a class of action types that includes multiple members such as "check-ins", "reservations", and "location data indicated visits". Such members of the class of action types may be included as search parameters. Also, for example, a determined locational semantic segment of the search query may be a geographic area that contains additional geographic areas. For example, "New York City" contains additional geographic areas such as the boroughs of "Manhattan", "Queens", "Brooklyn", etc. Such contained geographic areas may be included as search parameters. Also, for example, "California" contains additional geographic areas such as "Los Angeles", "San Francisco", "Oakland", etc. Such contained cities may be included as search parameters. Also, for example, a determined locational semantic segment of the search query may be a geographic area that denotes a number of geographic areas. For example, "nearby" may denote additional geographic areas such as the current city of the user, the current zip code of the user, and/or the current county of the user. Also, for example, "within 20 miles" may denote additional geographic areas such as any geographic areas within 20 miles of the user's current location. Such additional geographic areas may be included as search parameters. In some implementations that determine search parameters based on expanded interpretations of one or more determined locational semantic segments of the search query, the expanded interpretations may lead to identifying responsive items of private content 155 that may not otherwise be identified based on, for example, presence of only limited terms in such items and/or in index items based on such items.

Multiple determined search parameters may optionally be combined in a single disjunctive search query.

In some implementations one or more search parameters may specify, either explicitly or based on content thereof, whether index items indicative of any user interactions of a user should be considered as responsive to the search query, or whether only index items indicative of past visit interactions or index items indicative of non-past-visit interactions should be considered as responsive. For example, a search parameter may specify that only index items indicative of past visit interactions should be considered as responsive based on presence of one or more terms in a search query such as "visits" and/or based on presence of one or more action type segments in the search query indicative of actual visits. Also, for example, a search parameter may specify that index items indicative of any past interactions should be considered as responsive based on presence of one or more terms in a search query such as "interactions" and/or based on presence of one or more action type segments in the search query indicative of both actual past visit interactions and other non-past-visit interactions.

The ranking engine 136 uses the search parameters to search one or more index items of private content index 150 to identify items of private content 155 that are responsive to the search query 102, using, for example, conventional and/or other information retrieval techniques. In some implementations the ranking engine 136 may search one or more index items of private content index 150 only if the query processing engine 134 determines the search query 102 is a personal locational query and/or another query indicative of a desire to access private content index 150. In some implementations the ranking engine 136 may search only index items of private content index 150 that are identified, explicitly or based on content thereof, as index items related to physical locations previously interacted with by the user.

In some implementations the ranking engine 136 may determine which of one or more index items of private content index 150 to search based on the user information 103. The user information 103 specifies the identity of a user submitting the search query 102 and may be utilized to determine which index items the user is authorized to access. In some implementations the user information 103 may be provided with and/or included in the search query 102. For example, the user information 103 may be stored in a cookie that is submitted with and/or included in search query 102. For example, the user of client device 100 may access a website that includes a web page for submission of search query 102 and the website may use cookies to identify the user. Prior to submission of the search query 102, the website may include another webpage that prompts the user to fill out a form with identifying information of the user. Based on the identifying information, a cookie may be provided to a web browser executing on client device 100 and the cookie may be sent by the web browser to the search system 130 when the user submits the search query 102. Using the information in the cookie, the search engine 130 may determine which index items of private content index 150 are accessible to the user submitting the search query 102. For example, the search system 130 may compare the information in the cookie to access information associated with index items of the private content index 150 and determine that those index items that include access information matching information of the cookie may be accessed by the user.

The ranking engine 136 optionally calculates scores for the items of private content 155 that are responsive to the query, for example, using one or more ranking signals. Each signal provides information about the item itself and/or the relationship between the item and the search query. Signals for an item of private content 155 may be determined based on the index item referencing the item of private content 155 and/or the item of private content 155 itself. One example signal is a measure of the overall quality of the item. Another example signal is a measure of the number of search parameters that occur in the item and/or the number of times the search parameters occur in the item. Additional and/or alternative signals can also be used. For example, a ranking of the user associated with the item may be utilized as a signal, such as a user review associated with a restaurant for an item for a user-indicated interaction with the restaurant. Also, for example, a ranking of other users associated with the item may be utilized as a signal, such as reviews of other users for the restaurant. Also, for example, a date associated with a user's interaction with a physical location for an item for a user indicated interaction with the physical location may be utilized as a signal. For example, more recent interactions may be ranked more prominently than less recent interactions, all other ranking signals being equal. The ranking engine 136 then ranks the responsive items of private content 155 using the scores. For example, the responsive items are ranked based on the scores.

The presentation engine 138 uses the items identified and ranked by the ranking engine 136 to generate search results 108 that are responsive to the search query 102 and that include personal search results identifying physical locations previously interacted with by the user. For example, the search results 108 can include a search result for a physical location visited by the user that includes one or more aliases of the physical location, a location entity type of the physical location, a date and/or a time associated with one or more visits of the user to the physical location, an action type that associated the user with a visit to the physical location, a geographic area of the physical location, a user's rating of the physical location, other users' rating of the physical location, a mapping of the physical location, and/or other information that is related to the physical location. The search results 108 are transmitted to the client device 100 in a form that may be provided to the user. For example, the search results 108 may be transmitted as a search results web page to be displayed on a browser running on the client device and/or as one or more search results conveyed to a user via audio.

In some implementations the presentation engine 138 uses the items identified and ranked by the ranking engine 136 to determine additional content related to the responsive items for inclusion in the personal search result. For example, a responsive item of private content 155 may indicate that the user visited RestaurantA in City1 two months ago. However, the identified item of private content 155 may not include any additional information related to RestaurantA. The presentation engine 138 may access at least one resource that is in addition to the private content 155 to determine the additional information. For example, the presentation engine 138 may access entity database 160 to identify an entity associated with RestaurantA in City1. The presentation engine 138 may determine additional properties of the entity associated with RestaurantA that are mapped to the entity in the entity database 160 such as, for example, and address of RestaurantA, a phone number of RestaurantA, a website of RestaurantA, ratings associated with RestaurantA, a picture of RestaurantA, a search query that will retrieve search results particularly focused on RestaurantA, and so forth. Such additional content associated with RestaurantA may be included in the personal search result. In some implementations the entity database may include unique identifiers associated with one or more entities, such as entities associated with one or more location entity categories. Each of the unique entity identifiers may each be mapped to one or more properties associated with the entity. For example, a unique identifier for the entity associated with a particular hotel in a city may be associated with a name or alias property of "Hotel1", an address property of "123 Main Street", and a phone number property of "123-1234-12345". Additional and/or alternative properties may be associated with an entity in one or more databases such as entity database 160.

In some implementations ranking engine 136 also searches public content index 140 for items of public content 145 that are responsive to search query 102. For items of public content 150 identified as responsive to search query 102, ranking engine 136 may rank such search results. Presentation engine 138 may use the items of public content 155 identified and ranked by the ranking engine 136 to generate public search results for inclusion in search results 108. In some implementations public search results may be provided for display with the personal search results. In some implementations the personal search results may be distinguished from the public search results. For example, the personal search results and public search results may be formatted to visually separate the personal search results from the public search results. For example, the personal search results may be presented in a more prominent position such as at the top of the search results. Also, for example, the personal search results may be identified as personal search results with text accompanying the personal search results such as "only you can see these results", "these are results for places you have visited", "these are results that are personal to you", etc.

Figure 2:
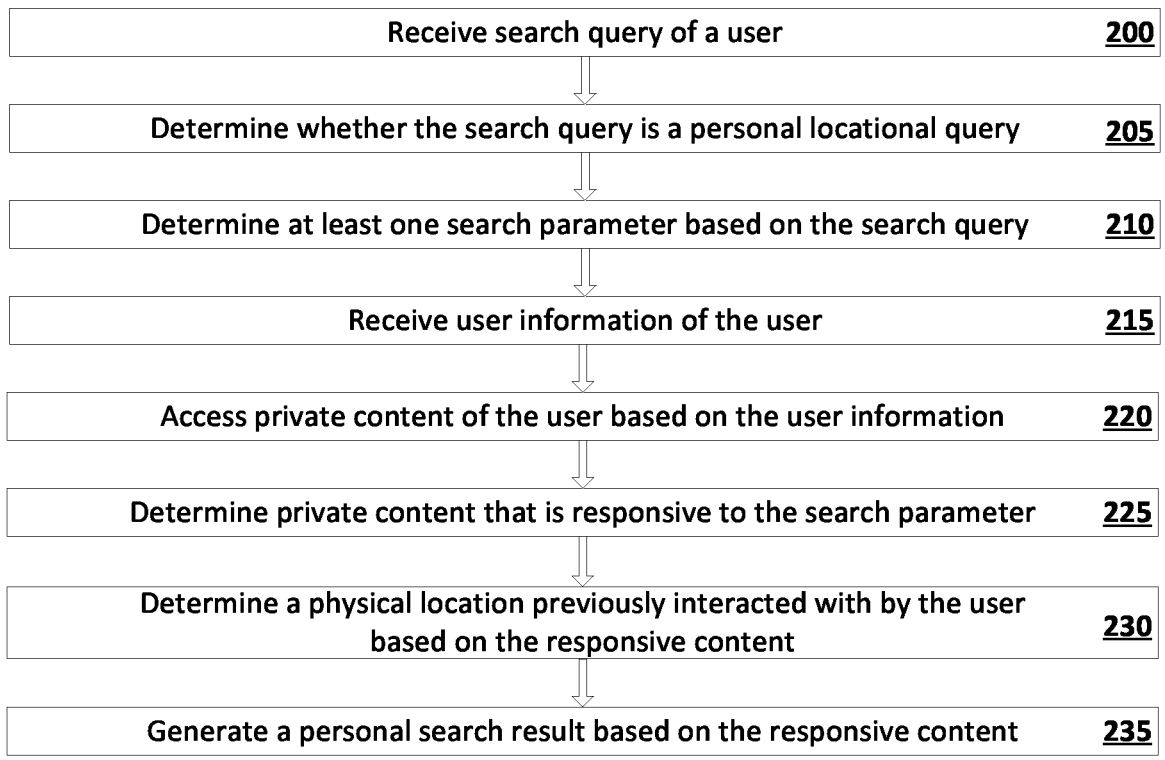
FIG. 2 is a flow chart illustrating an example method of generating a personal search result in response to a search query of a user.

FIG. 2 is a flow chart illustrating an example method of generating a personal search result in response to a search query of a user. Other implementations may perform the steps in a different order, omit certain steps, and/or perform different and/or additional steps than those illustrated in FIG. 2. For convenience, aspects of FIG. 2 will be described with reference to a system of one or more computers that perform the process. The system may include, for example, the engines of the search system 130 of FIG. 1.

At step 200, a search query of a user is received. For example, the query "coffee shops I've been to in brussels" may be received. In some implementations the search system 130 may receive the query.

At step 205, it is determined whether the search query is a personal locational query. A personal locational query is a query indicating a desire for information related to one or more physical locations previously interacted with by the user. In some implementations whether the search query is determined to be a personal locational query is based on whether the search query contains one or more terms indicative of a personal locational query. For example, the query "coffee shops I've been to in brussels" contains terms such as "I've" and "been to" that are indicative of a personal locational query. In some implementations whether the search query is determined to be a personal locational query is based on the syntactical arrangement of one or more terms of the search query. For example, the query "coffee shops I've been to in brussels" contains the term "I've" preceded by an entity location category ("coffee shops") and immediately followed by the terms "been to". Such an arrangement may be indicative of a personal locational query. In some implementations whether the search query is determined to be a personal locational query is based on the presence and/or arrangement of one or more locational semantic segments in the search query. For example, the query "coffee shops I've been to in brussels" contains the location entity category segment "coffee shops", the action type segment "been to", and the geographic area segment "brussels" that are collectively indicative of a personal locational query. In some implementations the query processing engine 134 may determine whether the search query is determined to be a personal locational query. In some implementations one or more steps of the example method of FIG. 2 may be dependent on determining the search query is a personal locational query. For example, in some implementations one or more of steps 225, 230, and/or 235 may only be performed if the query is determined to be a personal locational query. In some other implementations step 205 may be omitted.

At step 210 at least one search parameter is determined based on the search query. In some implementations the search parameter includes one or more terms of the search query. For example, for the search query "coffee shops I've been to in brussels" the terms "coffee shops" and "brussels" may be utilized as search terms. In some implementations the search parameter is based on locational semantic segment determined based on the query as described, for example, in the example method of FIG. 3. In some implementations the query processing engine 134 may determine the at least one search parameter.

At step 215 user information of the user is received. In some implementations user information is provided with the search query received at step 200. For example, the user information may be appended to the search query and/or provided with the search query, but separate from the search query (e.g., via a cookie transmitted with the search query). The user information specifies the identity of a user submitting the search query and may be utilized to determine which index items the user is authorized to access. In some implementations the search system 130 may receive the user information.

At step 220 private content of the user is accessed based on the user information received at step 215. For example, the user information may be utilized to determine which index items in the private content index 150 the user submitting the search query may access. For example, only those index items in the private content index 150 that are associated with access information that is determined to match the user information may be accessed. Also, for example, the user information may additionally and/or alternatively be utilized to determine which items of the private content 155 the user submitting the search query may access either directly and/or via the private content index 150. In some implementations the ranking engine 136 may access private content of the user based on the user information received at step 215.

At step 225, private content that is responsive to the search parameter determined at step 210 is determined. For example, the search parameter may be utilized to search one or more index items of private content index 150 to identify items of private content 155 that are responsive to the search parameters using, for example, conventional and/or other information retrieval techniques. For example, for the query "coffee shops I've been to in brussels", a previous check-in of a user to Coffee Shop A in Brussels may be determined based on an index item of private content index 150. In some implementations the ranking engine 136 may search one or more index items of private content index 150 only if the search query 102 is determined to be a personal locational query at step 205 and/or another query indicative of a desire to access private content index 150. In some implementations only index items of private content index 150 that are identified, explicitly or based on content thereof, as index items related to physical locations previously visited and/or otherwise interacted with by the user may be searched. In some implementations the ranking engine 136 may determine private content that is responsive to the search parameter.

At step 230, a physical location previously interacted with by the user is determined based on the responsive content determined at step 225. In some implementations the physical location may be determined based on a responsive index item of private content index 150. For example, the physical location may be determined directly from the responsive index item and/or via one or more items of private content 155 associated with the responsive item of private content index 150. For example, the query "coffee shops I've been to in brussels" a previous check-in of a user to Coffee Shop A in Brussels may be utilized to determine the physical location Coffee Shop A in Brussels. In some implementations information associated with the physical location may additionally be determined at step 230 based on the responsive content determined at step 225. For example, the index item of private content index 150 and/or the one or more items of private content 155 associated with the responsive index item may be utilized to determine information associated with the physical location such as a user's interaction with the physical location and/or information related to the given physical location that is not specific to the user's visit to the given physical location. For example, the use's check-in to Coffee Shop A in Brussels may be associated with a particular date that the user checked-in. In some implementations the ranking engine 136 may determine the physical location previously interacted with by the user based on the responsive content.

At step 235 a personal search result is generated based on the responsive content. The physical location determined at step 230 and/or other information associated with the physical location may be utilized to generate a personal search result that identifies the physical location previously interacted with by the user. Also, for example, as described in the method of FIG. 5, additional content related to the physical location may be determined from one or more resource that is additional to the private content index 150 and/or the private content 155 such as the entity database 160, the public content index 140, and/or public content 145. The personal search result generated may include, for example, one or more aliases of the physical location, a location entity type of the physical location, a date and/or a time associated with one or more interactions of the user with the physical location, an action type that associated the user with an interaction with the physical location, a geographic area of the physical location, a user's rating of the physical location, other users' rating of the physical location, a mapping of the physical location, and/or other information that is related to the physical location. The personal search result may be provided to the client device 100 in a form that may be provided to the user. In some implementations the presentation engine 138 generates the personal search result.

Figure 3:
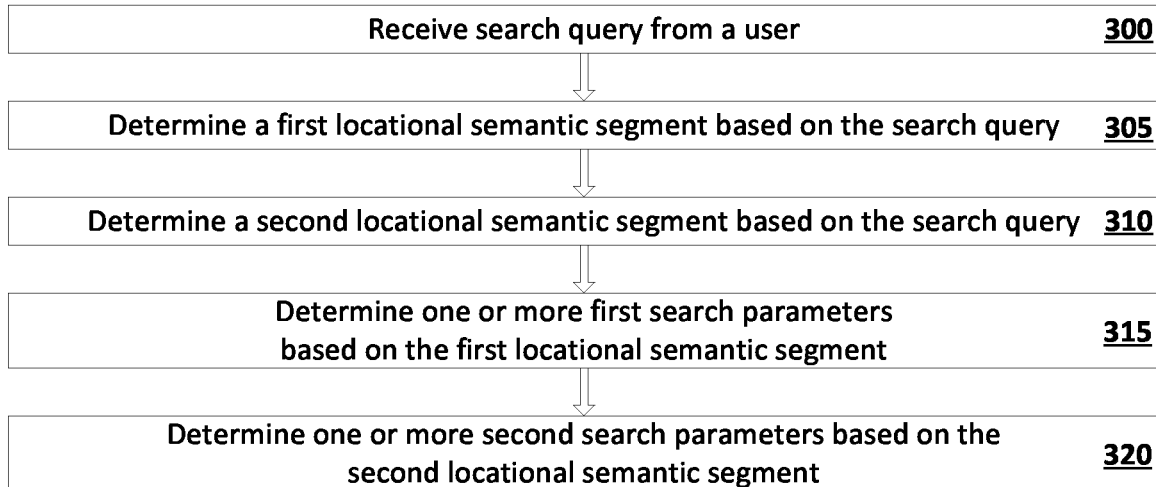
FIG. 3 is a flow chart illustrating an example method of determining locational semantic segments of a search query of a user and determining search parameters based on the locational semantic segments.
Figure 4:
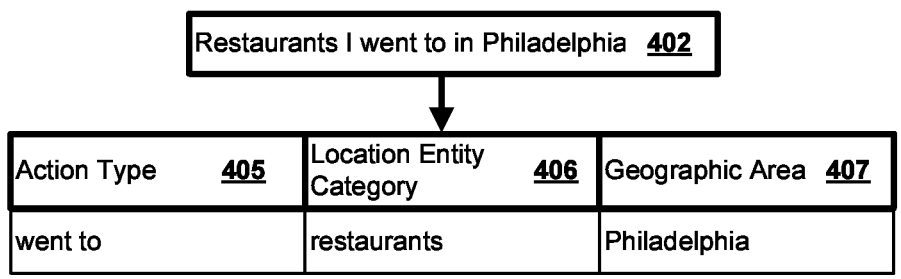
FIG. 4 is an example search query and example determined locational semantic segments for the search query.

FIG. 3 is a flow chart illustrating an example method of determining locational semantic segments of a search query of a user and determining search parameters based on the locational semantic segments. Other implementations may perform the steps in a different order, omit certain steps, and/or perform different and/or additional steps than those illustrated in FIG. 3. For convenience, aspects of FIG. 3 will be described with reference to a system of one or more computers that perform the process. The system may include, for example, the query processing engine 134 of the search system 130 of FIG. 1. Also, for convenience, aspects of FIG. 3 will be described with reference to the example search query and example determined locational semantic segments for the search query of FIG. 4.

At step 300, a search query of a user is received. For example, the query "restaurants I went to in philadelphia" 402 of FIG. 4 may be received. In some implementations the search system 130 may receive the query. Step 300 may share one or more aspects in common with step 200 of FIG. 2.

At step 305 a first locational semantic segment is determined based on the search query. For example, the query "restaurants I went to in philadelphia" 402 contains the action type segment 104 "went to" that is indicative of a personal locational query.

At step 310 a second locational semantic segment is determined based on the search query. For example, the query "restaurants I went to in philadelphia" 402 contains the location entity category segment 406 "restaurants" that is indicative of a personal locational query. It is noted that the query "restaurants I went to in philadelphia" 402 also contains the location geographic area segment 407 "philadelphia" that is indicative of a personal locational query.

At step 315 one or more first search parameters are determined based on the first locational semantic segment determined at step 305. In some implementations the first search parameters may include the term "went to" from the search query 402. In some implementations the first search parameters are additionally and/or alternatively based on expanded interpretations of the first locational semantic segment of the search query 402. For example, "went to" may be a class of action types that includes multiple members such as "check-ins", "reservations", and "location data indicated visits". Such members of the class of action types may be included as first search parameters.

At step 320 one or more second search parameters are determined based on the second locational semantic segment determined at step 310. In some implementations the second search parameters may include the term "restaurants" from the search query 402. In some implementations the second search parameters are additionally and/or alternatively based on expanded interpretations of the second locational semantic segment of the search query 402. For example, "restaurants" may be a class of location entity categories that includes multiple members such as "pizzerias", "diners", and "fine-dining establishments". Such members of the class of action types may be included as second search parameters.

The search parameters determined at steps 315 and 320 may be utilized to determine responsive personal content and generate a search result based on such content as described, for example, with respect to steps 225 and 235 of the method of FIG. 2.

Figure 5:
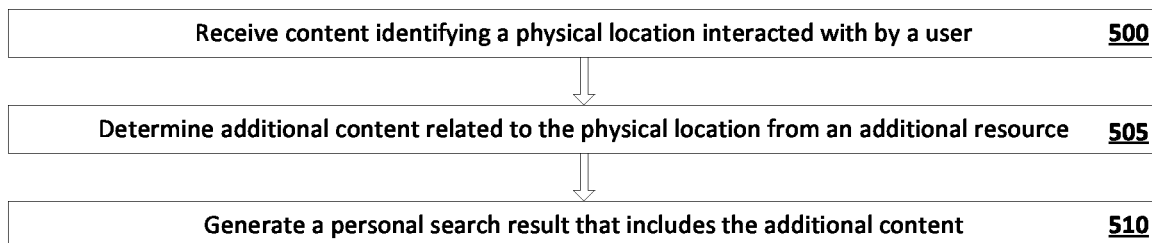
FIG. 5 is a flow chart illustrating an example method of determining additional content related to a physical location interacted with by a user and generating a personal search result that includes the additional content.

FIG. 5 is a flow chart illustrating an example method of determining additional content related to a physical location interacted with by a user and generating a personal search result that includes the additional content. For convenience, aspects of FIG. 5 will be described with reference to a system of one or more computers that perform the process. The system may include, for example, the presentation engine 138 of the search system 130 of FIG. 1.

At step 500, content is received that identifies a physical location interacted with by a user. In some embodiments the content received may be responsive private content determined at step 225 of the method of FIG. 2 and/or the physical location determined at step 230 of the method of FIG. 2.

At step 505, additional content related to the physical location is determined from an additional resource. Additional content related to the physical location may be determined from one or more resources that are additional to the private content index 150 and/or the private content 155 such as entity database 160. For example, the content identifying the physical location interacted with by the user may include the alias of the physical location and a city of the physical location. An entity associated with the physical location may be identified in an entity database 160 based on a mapping between the entity and the alias of the physical location and the city of the physical location. Additional information may be determined based on further mappings of the entity in the entity database 160. For example, one or more location entity categories mapped to the entity in the entity database 160 may be determined and/or contact information (e.g., phone number, address, website) mapped to the entity in the entity database 160 may be determined. Additional information may be determined from public content 145 related to the entity, available through the public content index 140, such as content from web pages related to the entity. For example, determined additional information may include menus available on the web page of a restaurant entity.

At step 510, a personal search result is generated that includes the additional content. For example, the personal search result may include an indication of a location entity category determined at step 505 and/or contact information determined at step 505.

Figure 6:
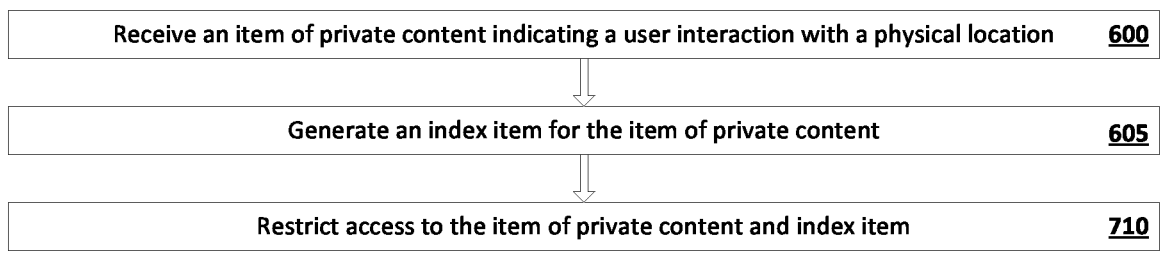
FIG. 6 is a flow chart illustrating an example method of indexing private content.

FIG. 6 is a flow chart illustrating an example method of indexing private content. For convenience, aspects of FIG. 6 will be described with reference to a system of one or more computers that perform the process. The system may include, for example, the indexing engine 132 of the search system 130 of FIG. 1.

At step 600, an item of private content is received that indicates a user interaction with a physical location. In some embodiments the item of private content may be received via crawling of one or more sources. In some implementations the item of private content may be provided by one or more sources without necessitating crawling of the sources. As an example, a location data indicated visit may be provided that indicates a visit to Restaurant A by a user on Mar. 16, 2013.

At step 605, an index item for the item of private content is generated. Continuing the example of step 600, the index item may include an indicator of a "visit", an indicator of "Restaurant A", and an indicator of the date "Mar. 16, 2013".

At step 610 access to the private content and the index item is restricted. For example, access may be allowed only for the user utilizing access information associated with the item of private content and/or the index item as described herein. Also, for example, access may be allowed to the user and one or more additional users indicated by the user.

Figure 7:
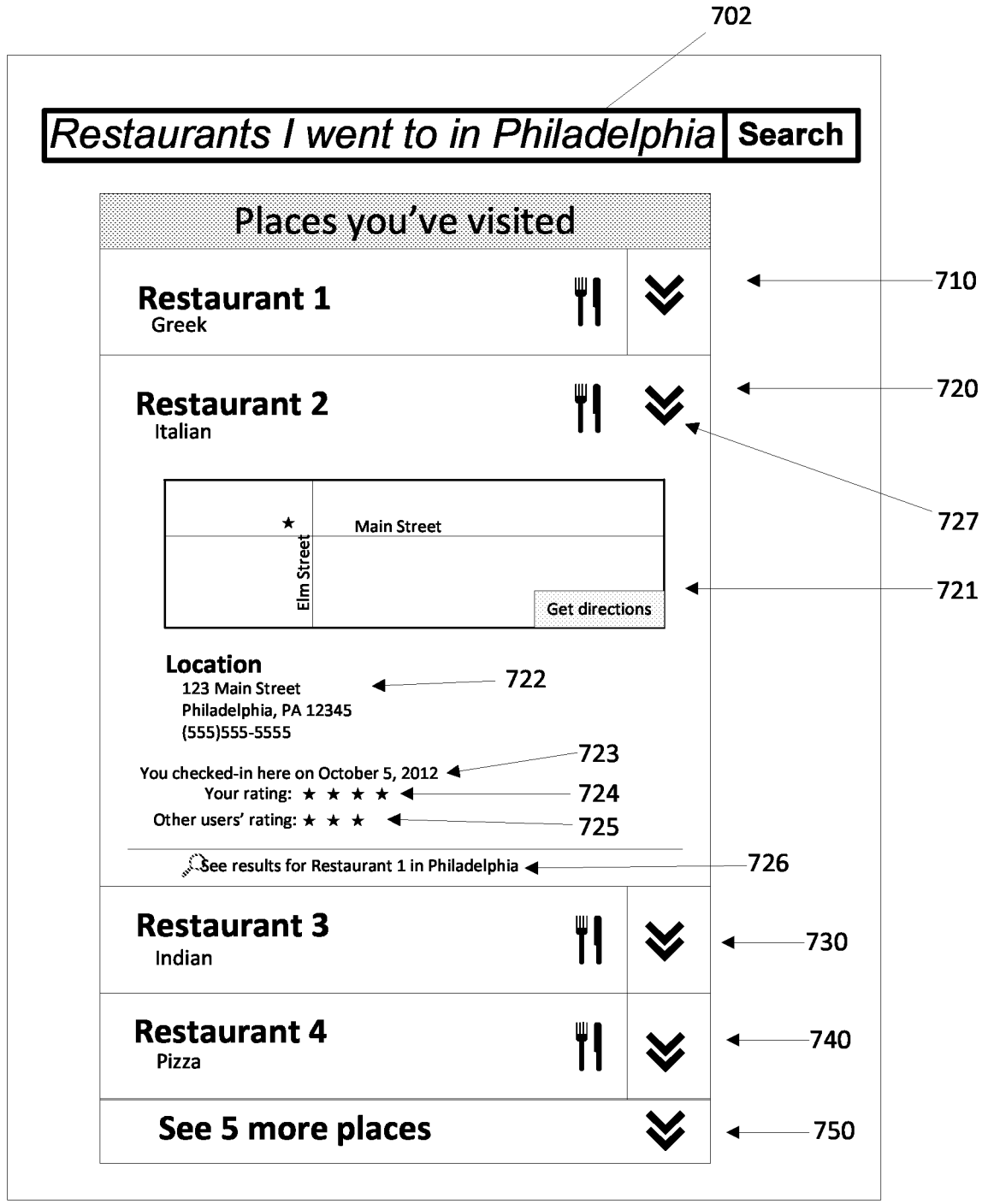
FIG. 7 illustrates an example graphical user interface for displaying personal search results in response to an example personal locational query.

FIG. 7 illustrates an example graphical user interface for displaying personal search results in response to an example personal locational query. In FIG. 7 the query "restaurants I went to in Philadelphia" 702 is submitted to a search system, through the graphical user interface, and personal search results 710, 720, 730, 740, and 750 that are responsive to the query 702 are generated by the search system and presented in the user interface. The personal search results are identified as personal search results by the text above the personal search results indicating they are "Places you've visited". The personal search results are each for a restaurant that was previously visited by the user. The personal search results in FIG. 7 may be presented based on a ranking as described herein.

Personal search result 710 includes an alias "Restaurant 1" of a restaurant visited by the user, provides a property of the restaurant "Greek" indicating the restaurant is a Greek restaurant, and includes a symbol of a fork and knife that is indicative of the personal search result 710 being for a restaurant. Personal search results 730 and 740 provided similar information related to the respective physical locations indicated in those search results. Personal search result 750 provides an interface element that may be selected by the user to enable additional personal search results to be displayed.

Personal search result 727 has been expanded by the user by selection of expansion interface element 727. It is noted that other personal search results 710, 730, and 740 likewise include expansion interface elements enabling expansion of those personal search results. Personal search result 720 also includes an alias "Restaurant 2" of a restaurant visited by the user, provides a property of the restaurant "Italian" indicating the restaurant is an Italian restaurant, and includes a symbol of a fork and knife that is indicative of the personal search result being for a restaurant. The expanded portion of the search result includes a map 721 providing an indication of the location of Restaurant 2 and an interface element "Get directions" that may be selected by the user to receive directions to Restaurant 2. Contact information 722 for Restaurant is also provided that includes the address and phone number of Restaurant 2. The action type of the user that is indicative of the action of the user that associated the previous visit to the physical location with the user is also indicated by text 723 that indicates the user "checked in here on Oct. 5, 2012". A rating of the user 724 for Restaurant 2 is also illustrated as is a rating of other users 725 for Restaurant 2. Selectable text 726 may be selected by the user to see search results that are particularly focused on Restaurant 2 as described herein.

As discussed herein, one or more aspects of the personal search result 720 may be based on private content of the user such as, for example, the indication that Restaurant 2 is a location previously visited by the user, the text 723, and/or the rating of the user 724. Moreover, as discussed herein, one or more aspects of the personal search result 720 may optionally be determined based on a resource that is in addition to private content of the user such as, for example, the contact information 722, the rating of other users 725, and or the search query associated with the selectable text 726. Other methods of presenting personal search results are possible.

Figure 8:
FIG. 8 illustrates another example graphical user interface for displaying personal search results in response to another example personal locational query.

FIG. 8 illustrates another example graphical user interface for displaying personal search results in response to another example personal locational query. In FIG. 8 the query "places I visited in LA" 802 is submitted to a search system, through the graphical user interface, and personal search results 810, 820, 830, 840, and 850 that are responsive to the query 802 are generated by the search system and presented in the user interface. The personal search results are identified as personal search results by the text above the personal search results indicating they are "Places you've visited". The personal search results represent visits to a variety of entity location categories that were previously visited by the user since the search query 802 includes "places" and does not specify a particular type of place such as a "restaurant". The personal search results in FIG. 8 may be presented based on a ranking as described herein.

Personal search result 810 includes an alias 811 of "Hotel 1" of a hotel visited by the user, provides a property of the restaurant 812 of "Luxury hotel" indicating the hotel is a luxury hotel, and includes a symbol 813 of a bed that is indicative of the personal search result 810 being for a hotel. Personal search result 810 includes an interface element 814 that enables the personal search result 810 to be expanded by the user by selection of the interface element. Personal search results 820, 830, and 840 provide similar information related to the respective physical locations indicated in those search results. In particular, personal search result 820 provides information related to a restaurant previously visited by the user, personal search result 830 provides information related to a store previously visited by the user, and personal search result 840 provides information related to another restaurant previously visited by the user. Personal search result 850 provides an interface element that may be selected by the user to enable additional personal search results to be displayed. In some implementations one or more of the personal search results 810, 820, 830, 840 may be expanded without interaction by the user. For example, in some implementations the top search result 810 may be pre-expanded upon initial presentation of the search results. In some implementations whether a search result is expanded may be based on, for example, the ranking of the search result and/or a screen size of the client device rendering the user interface displaying the search results.

FIG. 9 illustrates an example graphical user interface for displaying personal search results and public search results in response to an example personal locational query. In FIG. 9 the query "restaurants I went to in Philadelphia" 902 is submitted to a search system, through the graphical user interface, and personal search results 910, 920, 930, 940, and 950 that are responsive to the query 902 are generated by the search system and presented in the user interface. The personal search results 910, 920, 930, 940, and 950 are similar to personal search results 710, 720, 730, 740, and 750 of FIG. 7. Public search results 960 are also provided below the personal search results and are visually distinguishable from the personal search results.

Figure 10:
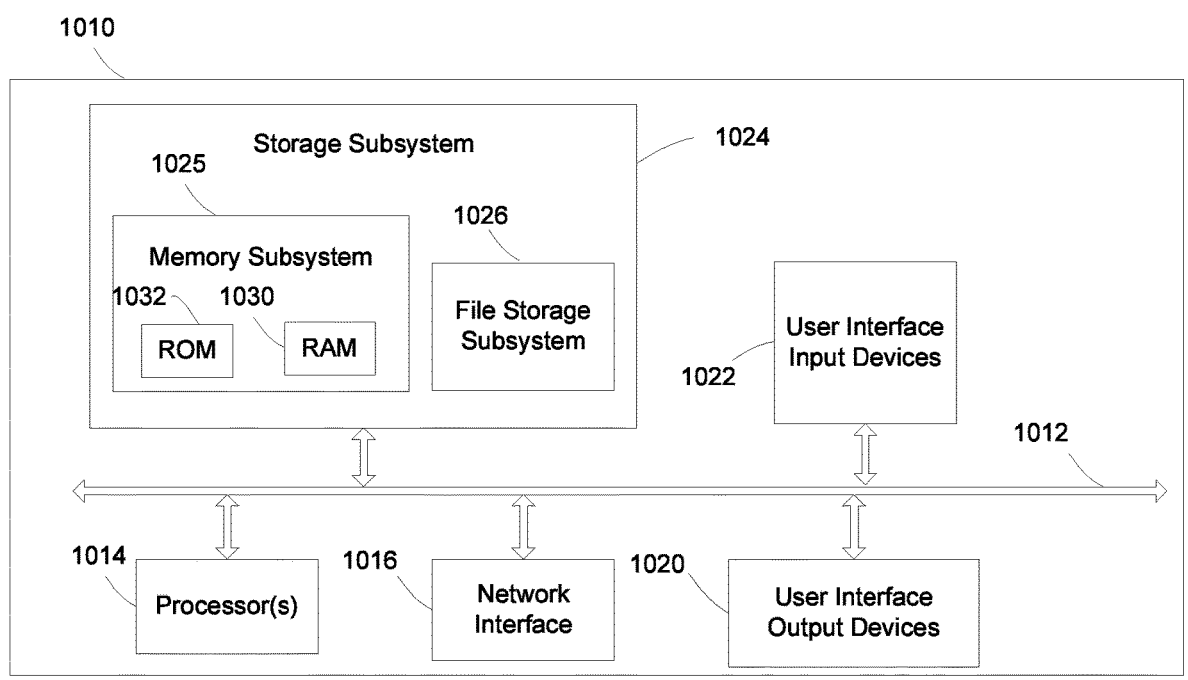
FIG. 10 illustrates an example architecture of a computer system.

FIG. 10 is a block diagram of an example computer system 1010. Computer system 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface input devices 1022, user interface output devices 1020, and a network interface subsystem 1016. The input and output devices allow user interaction with computer system 1010. Network interface subsystem 1016 provides an interface to outside networks and is coupled to corresponding interface devices in other computer systems.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1010 to the user or to another machine or computer system.

Storage subsystem 1024 stores programming and data constructs that provide the functionality of some or all of the modules described herein. For example, the storage subsystem 1024 may include the logic to perform one or more methods discussed herein with respect to search system 130 such as, for example, generating a personal search result identifying a physical location previously interacted with by a user.

These software modules are generally executed by processor 1014 alone or in combination with other processors. Memory 1025 used in the storage subsystem can include a number of memories including a main random access memory (RAM) 1030 for storage of instructions and data during program execution and a read only memory (ROM) 1032 in which fixed instructions are stored. A file storage subsystem 1024 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1024 in the storage subsystem 1024, or in other machines accessible by the processor(s) 1014.

Bus subsystem 1012 provides a mechanism for letting the various components and subsystems of computer system 1010 communicate with each other as intended. Although bus subsystem 1012 is shown schematically as a single bus, alternative implementations of the bus subsystem may use multiple busses.

Computer system 1010 can be of varying types including a workstation, server, computing cluster, blade server, server farm, or any other data processing system or computing device. Due to the ever-changing nature of computers and networks, the description of computer system 1010 depicted in FIG. 10 is intended only as a specific example for purposes of illustrating some implementations. Many other configurations of computer system 1010 are possible having more or fewer components than the computer system depicted in FIG. 10.

While several inventive implementations have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive implementations described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive implementations described herein. It is, therefore, to be understood that the foregoing implementations are presented by way of example only and that, within the scope of the appended claims and equivalents thereto, inventive implementations may be practiced otherwise than as specifically described and claimed. Inventive implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over vocabulary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method implemented by one or more processors, the method comprising:
   generating an entry in a personal content repository, the personal content repository including private content that is accessible to a user and non-accessible to a plurality of additional users that lack authorization to access the personal content repository,
      wherein the entry identifies a physical location and a date of interaction of the user with the physical location, and wherein generating the entry is based on location data of the user or a received email of the user;
   subsequent to generating the entry:
      receiving a search query that is submitted by the user, via a client device, and through a user interface for searching both private and public content;
      determining whether the search query is a personal locational query indicating a desire for only one or more personal search results, of the user, from the private content of the personal content repository;
      accessing the personal content repository;
      determining that the generated entry of the personal content repository is responsive to the search query based on the entry matching at least one search parameter of the search query;
      in response to determining that the search query is the personal locational query indicating the desire for only one or more personal search results, of the user, from the private content of the personal content repository:
         generating, based on determining that the entry is responsive to the search query, a personal search result based on the entry, wherein generating the personal search result comprises including, in the personal search result:
            an identifier of the physical location based on the entry identifying the physical location, and
            a temporal indication that identifies the date of interaction of the user with the physical location based on the entry identifying the date of interaction of the user; and
         in response to receiving the search query submitted through the user interface for searching both private and public content:
            causing the personal search result to be rendered at the client device, or an additional client device of the user, without rendering of any public search result responsive to the search query; and
      in response to determining that the search query is not the personal locational query indicating the desire for only one or more personal search results:
         determining a public search result, from a public content repository, that is responsive to the search query, and
         in response to receiving the search query submitted through the user interface for searching both private and public content:

causing the public search result to be rendered at the client device, or the additional client device of the user, without rendering of any private search result.

2. The method of claim 1, wherein generating the entry is based on the location data of the user.

3. The method of claim 2, wherein generating the personal search result further comprises:
   determining additional content related to the physical location from at least one resource that is additional to the personal content repository, the additional content not being included in the personal content repository; and
   including the additional content in the personal search result.

4. The method of claim 3, wherein the additional content includes a rating, of other users, of the physical location.

5. The method of claim 4, wherein the additional content includes a picture of the physical location.

6. The method of claim 3, wherein the additional content includes a picture of the physical location.

7. The method of claim 1, wherein determining that the search query is the personal locational query is based on matching at least one personal locational query term to one or more terms of the search query.

8. The method of claim 1, wherein determining that the search query is the personal locational query is based on determining presence of one or more personal locational semantic segments in the search query, each of the personal locational semantic segments being based on one or more terms of the search query.

9. The method of claim 8, wherein the personal locational semantic segments whose presence in the search query is used in determining that the search query is the personal locational query, include at least one of a location entity category segment, an action type segment, a reference geographic area segment, or a temporal segment.

10. The method of claim 9, wherein the personal locational semantic segments whose presence in the search query is used in determining that the search query is the personal locational query, include a location entity category segment and a temporal segment.

11. The method of claim 9, wherein the personal locational semantic segments whose presence in the search query is used in determining that the search query is the personal locational query, include a location entity category segment, a geographic area segment, and a temporal segment.

12. The method of claim 1, wherein causing the personal search result to be rendered at the client device comprises causing the personal search result to be audibly rendered.

13. The method of claim 12, wherein the search query is a spoken search query.

14. A system, comprising:
   a personal content repository including private content that is accessible to a user and non-accessible to a plurality of additional users that lack authorization to access the personal content repository,
      wherein the personal content repository includes an entry that identifies a physical location and a date of interaction of the user with the physical location, and wherein the entry is generated based on data, of the user, that corresponds to or includes the physical location and the date of interaction;
   memory storing instructions;
   one or more processors operable to execute the instructions stored in the memory to:
      receive a search query that is submitted by the user, via a client device, and through a user interface for searching both private and public content;
      determine whether the search query is a personal locational query indicating a desire for only one or more personal search results of the user;
      access the personal content repository;
      determine that the entry of the personal content repository is responsive to the search query based on the entry matching at least one search parameter of the search query;
      in response to determining that the search query is the personal locational query indicating the desire for only one or more personal search results of the user:
         generate, based on determining that the entry is responsive to the search query, a personal search result, wherein the personal search result includes:
            an identifier of the physical location based on the entry identifying the physical location, and
            a temporal indication that identifies the date of interaction of the user with the physical location based on the entry identifying the date of interaction of the user; and
         in response to receiving the search query submitted through the user interface for searching both private and public content:
            cause the personal search result to be rendered at the client device, or an additional client device of the user, without rendering of any public search result responsive to the search query; and
      in response to determining that the search query is not the personal locational query indicating the desire for only one or more personal search results:
         determine a public search result, from a public content repository, that is responsive to the search query, and
         in response to receiving the search query submitted through the user interface for searching both private and public content:
            cause the public search result to be rendered at the client device, or the additional client device of the user, without rendering of any private search result.

15. The system of claim 14, wherein the entry is generated based on the location data of the user, and wherein in generating the personal search result one or more of the processors are further to:
   determine additional content related to the physical location from at least one resource that is additional to the personal content repository, the additional content not being included in the personal content repository; and
   include the additional content in the personal search result.

16. The system of claim 15, wherein the additional content includes a picture of the physical location and includes a rating, of other users, of the physical location.

17. The system of claim 14, wherein in determining that the query is the personal locational query, one or more of the processors are to determine that the query is the personal locational query based on matching at least one personal locational query term to one or more terms of the search query.

18. The system of claim 14, wherein in determining that the query is the personal locational query, one or more of the processors are to determine that the query is the personal locational query based on determining presence of one or more personal locational semantic segments in the search query, each of the personal locational semantic segments being based on one or more terms of the search query.

19. The system of claim 18, wherein the personal locational semantic segments whose presence is used in determining that the query is the personal locational query include at least two of a location entity category segment, an action type segment, a reference geographic area segment, or a temporal segment.

20. The system of claim 14, wherein in causing the personal search result to be rendered at the client device, one or more of the processors cause the personal search result to be audibly rendered.

* * * * *